United States Patent [19]

Vercesi et al.

[11] Patent Number: 5,020,896
[45] Date of Patent: Jun. 4, 1991

[54] REVERSIBLE ELECTROMECHANICAL DEVICE FOR REMOTELY CONTROLLING THE ORIENTATION OF THE REFLECTING SURFACE OF REAR-VIEW MIRRORS FOR MOTOR VEHICLES

[75] Inventors: Piercarlo Vercesi, Pavia; Claudio Davico, Grugliasco; Gerardo Giorgini, Moncalieri, all of Italy

[73] Assignee: Foggini Progetti S.r.l., Beinasco, Italy

[21] Appl. No.: 358,914

[22] Filed: May 30, 1989

[51] Int. Cl.[5] .............................. G02B 7/18; B60R 1/06
[52] U.S. Cl. ...................................... 350/636; 350/637
[58] Field of Search ................ 350/636, 637, 634, 633

[56] References Cited

U.S. PATENT DOCUMENTS

| | | | |
|---|---|---|---|
| 4,428,649 | 1/1984 | Main et al. | 350/637 |
| 4,449,788 | 5/1984 | Suzuki | 350/637 |
| 4,733,957 | 3/1988 | Losch | 350/636 |

FOREIGN PATENT DOCUMENTS

| | | | |
|---|---|---|---|
| 35934 | 3/1979 | Japan | 350/637 |
| 193741 | 10/1985 | Japan | 350/637 |

Primary Examiner—Jon W. Henry
Attorney, Agent, or Firm—Guido Modiano; Albert Josif

[57] ABSTRACT

The device comprises a frame for oscillably supporting the reflecting surface, with a first and second portion pivoted to one another and to the body of the mirror along a first and a second oscillation axes which are mutually orthogonal; a pair of rods respectively rigidly associated with, and orthogonal to the mirror body and to the reflecting surface, one being arranged eccentrically with respect to the first, the other to the second oscillation axis; a pair of actuation rollers each whereof co-operates in contact engagement with each rod in order to move the rods parallel to themselves; and at least one electric motor for rotating the rollers with the interposition of reduction gears and for producing axial movements of the rods and corresponding oscillations of the frame portions about the respective pivoting axes, in order to orientate the reflecting surface.

8 Claims, 2 Drawing Sheets

REVERSIBLE ELECTROMECHANICAL DEVICE FOR REMOTELY CONTROLLING THE ORIENTATION OF THE REFLECTING SURFACE OF REAR-VIEW MIRRORS FOR MOTOR VEHICLES

BACKGROUND OF THE INVENTION

The present invention relates to a reversible electromechanical device for remotely controlling the orientation of the reflecting surface of rear-view mirrors for motor vehicles.

Electromechanical devices for orientating the reflecting surface of rear-view mirrors are already known, but such devices currently have the following considerable disadvantages which significantly limit their diffusion:

a complicated mechanical structure, with consequent considerable bulk and poor reliability in operation, non-reversibility of the orientation movements, i.e. the reflecting surface cannot be orientated manually from the outside since the device opposes and prevents such motion, sensitivity of the reflecting surface to vibrations, due to the presence and nature of the articulations interposed between the retention shell and said surface.

The considerable dimensions of current actuator devices causes the reflecting surface's retention shell to be given large dimensions which are not always compatible with aerodynamic and aesthetic requirements. The non-reversibility of the orientation movements involves the use of an orientatable coupling to support the shell, in order to allow the manual orientation of said shell if the electromechanical device acting on the reflecting surface fails to operate, while sensitivity to vibrations reduces the functionality of the rear-view device due to the unpleasant movement of the reflected images.

SUMMARY OF THE INVENTION

The aim of the present invention is essentially to eliminate the above mentioned considerable disadvantages, and within this aim it has the important object of providing an electromechanical device for remotely controlling the movement of the reflecting surface of rear-view mirrors which is considerably simplified from a structural point of view, has limited dimensions, is reliable in operation and is reversible, i.e. it allows orientation of the reflecting surface by means of an external manual action, and such as to ensure the effective retention of said reflecting surface, which is absolutely insensitive to the vibrations produced by the vehicle motion.

In order to achieve these objects and others which will become apparent from the following detailed description, the present invention relates to an electromechanical device for remotely controlling the orientation of the reflecting surface of rear-view mirrors, characterized in that it comprises a frame for oscillably supporting the reflecting surface, with a first and a second portions pivoted to one another and with respect to the mirror body according to mutually orthogonal first and second oscillation axes; a pair of rods rigidly associated with, and orthogonal to respectively the mirror body and the reflecting surface, one of said rods being arranged eccentrically to the first, the other to the second oscillation axis; a pair of actuation rollers, each whereof co-operates by contact engagement with each rod to move said rods parallel to themselves; and at least one electric motor for rotating said rollers, with the interposition of reducer means, for producing axial movements of the rods and corresponding oscillations of the frame portions about the respective pivoting axes so as to orientate the reflecting surface.

According to the invention, the actuation rollers of the rods are covered with an elastically yielding material which ensures the transmission of the motion to the rods by adhesion contact and simultaneously allows end-of-stroke slippage and motion reversibility for directing the reflecting surface in the specified direction by virtue of the frictional disengagement of said rollers from said rods.

BRIEF DESCRIPTION OF THE DRAWINGS

Further characteristics, purposes and advantages of the present invention will become apparent from the following detailed description and with reference to the accompanying drawings, given by way of non-limitative example, wherein.

DESCRIPTION OF THE PREFERRED EMBODIMENTS

Figure 1:
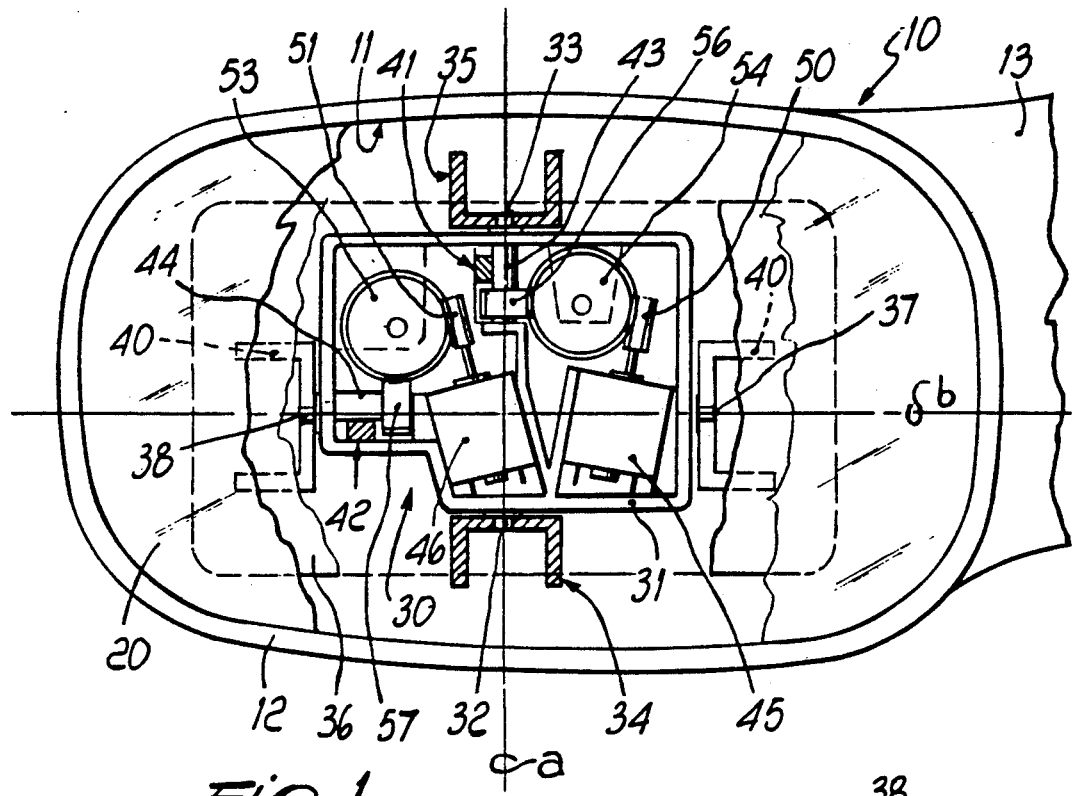
FIG. 1 is a partially sectional plan view of an external rear-view mirror for motor vehicles, with the orientation device according to a preferred embodiment of the present invention.
Figure 2:
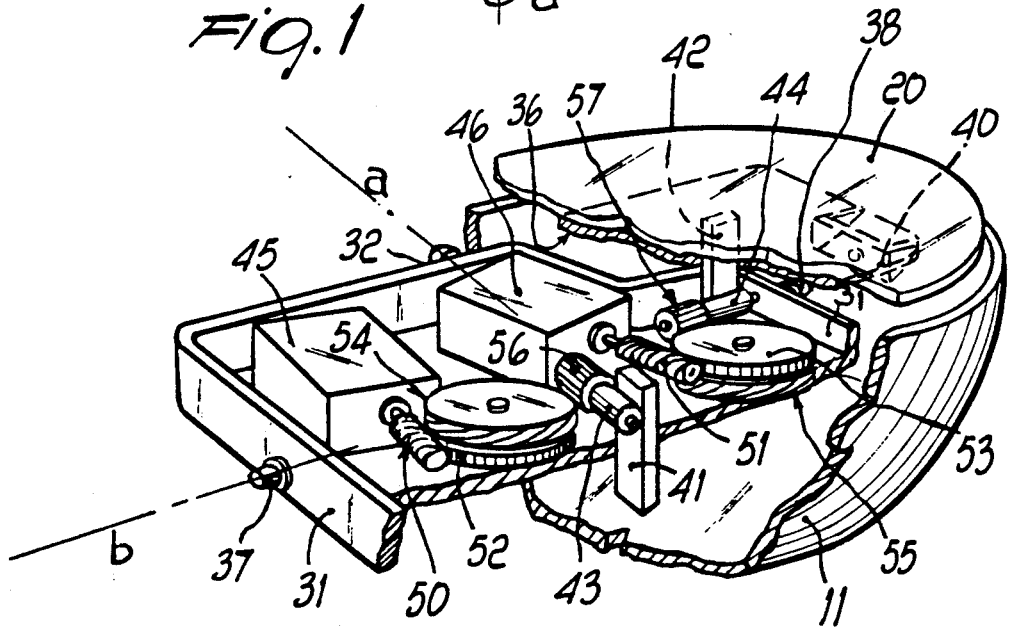
FIG. 2 is a partially sectional perspective view of the device of FIG. 1.

Initially with reference to FIGS. 1 and 2, 10 generally indicates the body of an external rear-view mirror formed by a hollow half-shell 11 of polymeric material and 20 indicates the reflecting surface, which closes the cavity of said half-shell 11 and is surrounded by a border 12 which encircles said cavity.

The surface 20 can be orientated with respect to the body 10, which is rigidly associated, by means of a strong rigid stem 13, to the bodywork of the vehicle; said orientation is provided by the device 30, which is accommodated in the cavity of the half-shell 11 and is controlled by one or more remote control pushbuttons located inside the motor vehicle.

According to the present invention, the device 30 comprises a frame for oscillably supporting the reflecting surface 20, which frame comprises a first portion 31 pivoted by means of opposite pivots 32-33 to corresponding supports 34-35 rigidly associated with the shell 11, and a second portion 36 pivoted to the first one by means of corresponding opposite pivots 37-38; the pairs of opposite pivots 32-33 and 37-38 respectively define a first oscillation axis a and a second oscillation axis b which are orthogonal to one another, being arranged on corresponding opposite pairs of sides of the first portion 31 of the support.

As is clearly illustrated in the figure, said first portion 31 of the oscillable support is constituted by an auxiliary small frame or by a substantially rectangular plate, and the second portion 36 is constituted by a plate with pivoting wings 40 which plate is intended to support the reflecting surface 20 with the interposition of adapted adhesive means (for example a double-adhesive tape).

The described configuration of the frame 30 is particularly advantageous, because the mutual distance between the pivots of each pair, which define each oscillation axis, ensures a considerable rigidity of the assembly, on which absolute insensitivity to vibrations and high reliability in operation depend.

A pair of rods 41-42 with substantially rectangular cross section passes inside the small frame 31; the first of said rods is arranged eccentrically to the oscillation axis a and the second one to the oscillation axis b. The rod 41 is rigidly associated with the shell 11 which forms the mirror's rigid body and is orthogonal thereto, while the rod 42 is rigidly associated with and orthogonal to the plate 36 which supports the reflecting surface 20. An actuation roller 43 and respectively 44 co-operates with each rod by contact engagement and receives its motion from a corresponding polarity-reversal motor 45-46 by means of an interposed reduction gear. The rollers, the motors and the interposed gears are all supported by the small frame 31 which constitutes the first portion of the main oscillable frame.

As clearly illustrated in FIG. 2, in order to reduce overall dimensions, the reduction gears interposed between each roller and the respective motor comprise a worm screw 50-51 which is keyed to the shaft of the respective motor and meshes with a concave-toothed gear 52-53 which is in turn rigidly associated with a helical gear 54-55 which meshes with a worm screw 56-57 defined monolithically with the respective roller 43 and 44.

It can be easily understood that if the motor 45 which rotates the roller 43 is energized, the roller 43 moves along the rod 41 and the supporting frame consequently rotates about the axis a by virtue of the above mentioned contact engagement, while if the motor 46 is energized the rod 42 moves and the plate 36 consequently rotates about the axis b. In order to achieve said contact engagement, the rollers 43 and 44 are advantageously provided with a covering of elastically yielding material, for example natural or synthetic rubber, which ensures relative movement between the rollers 43, 44 and the rods 41, 42 but simultaneously allows the rollers to slip when the rods or the rollers reach their respective end-of-stroke position and the orientation movement to be reversible, i.e. if one or both of the device motors fail to operate, the reflecting surface 20 can be orientated by means of an adequate external manual action, which is allowed by the slippage of the rods on the rollers, in other words by the frictional disengagement of the former from the latter.

Figure 3:
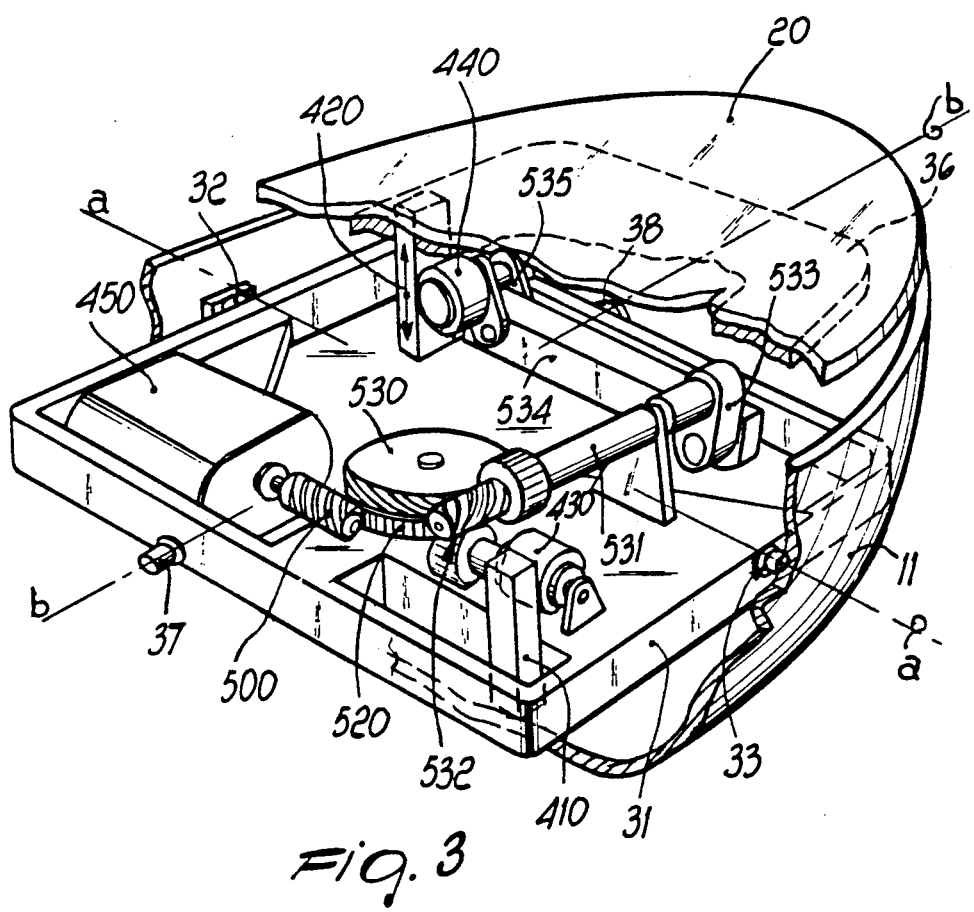
FIG. 3 is a perspective view, similar to FIG. 2, of a different constructive embodiment of the device.

The variated embodiment of FIG. 3 relates to a device in which a single motor simultaneously actuates the oscillation of the reflecting surface about the two axes a and b with differentiated reduction ratios, according to the teachings of prior European patent application No. 0243848 which are assumed to be known to those skilled in the art.

According to this variated embodiment, the motor 450 transmits its motion by means of the worm screw 500 and the gears 520,530 to a transmission shaft 531 which actuates, by means of a screw-sprocket reduction pair 532, a roller 430 which co-operates by contact engagement with a respective rod 410. On the opposite side with respect to the reduction pair 532 the shaft 531 has a first crank 533 which causes oscillation, by means of a transmission rod 534, of a second crank 535 which is keyed to the shaft of a second roller 440 which co-operates by contact engagement with a corresponding rod 420. The rods 410 and 420 are respectively rigidly connected to the rigid shell 11 of the mirror and to the plate 36 which supports the reflecting surface 20. The mechanism constituted by the cranks 533, 535 and by the connecting rod 534 produces an alternating rotation of the roller 440 so that the rod 420 performs a plurality of reciprocating movements for each complete stroke of the rod 410, thus achieving the condition in which the oscillation of the reflecting surface about one axis is a fraction of the oscillation about the other axis, as described in the above mentioned patent aplication No. 0243848.

The details of execution and the embodiments may naturally be extensively variated with respect to what is described and illustrated by way of non-limitative example without thereby abandoning the scope of the invention and without altering the inventive concept.

We claim:

1. An electromechanical device for remotely controlling the orientation of a reflecting surface of rearview mirrors for motor vehicles, said device comprising a frame means for oscillably supporting the reflecting surface, said frame means being connected to a body means which is rigidly connectable to a motor vehicle, said frame means comprising a first frame portion pivoted to said body means about a first oscillation axis, said frame means further comprising a second frame portion for rigidly supporting the reflecting surface, said second frame portion being pivoted to said first frame portion about a second oscillation axis, said first and second oscillation axes being mutually orthogonal oscillation axes, said device further comprising a first rod means and a second rod means, said first rod means being rigidly connected to said body means and being arranged eccentrically to said first oscillation axis, said second rod means being rigidly connected to said second frame portion and being arranged eccentrically to said second oscillation axis, said device further comprising a first actuation roller means, a second actuation roller means, and at least one electric motor means for rotating said actuation roller means, said first actuation roller means being interposed between said first rod means and said first frame portion, said second roller means being interposed between said second rod means and said first frame portion, whereby said first actuation roller means co-operate in contact engagement with said first rod means when said motor means rotates said first actuation roller means to thereby cause a relative movement of said first rod means with respect to said first actuation roller means which in turn causes a relative rotation of said first frame portion with respect to said body means, and whereby said second actuation roller means co-operate in contact engagement with said second rod means when said motor means rotates said second actuation roller means to thereby cause a relative movement of said second rod means with respect to said second actuation roller means which in turn causes a relative rotation of said second frame portion with respect to said first frame portion means.

2. A device according to claim 1, wherein said first frame portion comprises a substantially rectangular auxiliary frame and said second frame portion comprises a plate supporting the reflecting surface by means of adhesive means.

3. A device according to claim 1, wherein said first frame portion comprises a substantially rectangular auxiliary frame and said second frame portion comprises a plate supporting the reflecting surface by means of adhesive means, said auxiliary frame being provided with, at two first opposite sides thereof, a first pair of pivots arranged along said first oscillation axis for pivoting said auxiliary frame to said body means, said auxiliary frame being further provided with, at two second opposite sides thereof, a second pair of pivots arranged along said second oscillation axis, said plate being provided with a pair of pivoting wings co-operating with said second pair of pivots to thereby pivot said plate to said auxiliary frame.

4. A device according to claim 1, wherein said first frame portion supports said first and second actuation roller means and said motor means, said device further comprising reduction gear means being supported on said first frame portion and being interposed between said motor means and said first and second actuation roller means.

5. A device according to claim 4, wherein said motor means comprise a pair of polarity-reversal motors, for independently actuating each of said first and said second actuation roller means.

6. A device according to claim 1, wherein said first and said second actuation roller means are covered with an elastically yielding material for ensuring motion transmission to said first and said second rod means and for simultaneously allowing end-of-stroke slippage and reversibility movement for manual orientation of the reflecting surface.

7. A device according to claim 4, wherein said motor means comprise a pair of polarity-reversal motors for independently actuating each of said first and said second actuation roller means, said reduction gear means comprising for each of said pair of motors a first worm screw keyed to a shaft of a respective one of said pair of motors, a concave-toothed gear which meshes with said first worm screw, a helical gear rigidly connected with said concave-toothed gear, and a second worm screw which meshes with said helical gear and which is defined monolithically with a respective one of said actuation roller means.

8. A device according to claim 1, wherein said first frame portion supports said first and second actuation roller means and said motor means, said motor means comprising a single motor for rotating both said first and second actuation roller means, said device further comprising reduction gear means being supported on said first frame portion, said reduction gear means comprising a first worm screw keyed to a shaft of said single motor, a concave-toothed gear which meshes with said first worm screw, and a helical gear rigidly connected with said concave-toothed gear, said helical gear driving a transmission shaft means supported by said first frame portion, a screw-sprocket reduction pair being provided at one end of said transmission shaft means for actuating said first rod means which are connected to said screw-sprocket reduction pair, said device further comprising a first crank connected to a second end of said transmission shaft means and a transmission rod being connected at a first end thereof to said first crank, a second crank being provided which is keyed to a shaft of said second actuation roller means, said second crank being connected to a second end of said transmission rod, said first and second cranks and said transmission rod causing for every single rotation of said transmission shaft means an alternating rotation of said second actuation roller means while said first actuation roller means achieves a rotation in a single direction, thereby due to the co-operation of said first and said second rod means with said first and said second actuation roller means, the oscillation of said reflecting surface about said second oscillation axis is a fraction of the oscillation of said reflecting surface about said first oscillation axis.

* * * * *